(12) United States Patent
Yang-Stephens et al.

(10) Patent No.: US 7,065,514 B2
(45) Date of Patent: Jun. 20, 2006

(54) DOCUMENT-CLASSIFICATION SYSTEM, METHOD AND SOFTWARE

(75) Inventors: Bokyung Yang-Stephens, Apple Valley, MN (US); M. Charles Swope, St. Paul, MN (US); Jeffrey Locke, West St. Paul, MN (US); Isabelle Moulinier, Eagan, MN (US)

(73) Assignee: West Publishing Company, Eagan, MN (US)

( * ) Notice: Subject to any disclaimer, the term of this patent is extended or adjusted under 35 U.S.C. 154(b) by 257 days.

(21) Appl. No.: 10/013,190

(22) Filed: Nov. 5, 2001

(65) Prior Publication Data

US 2002/0138529 A1    Sep. 26, 2002

Related U.S. Application Data

(63) Continuation of application No. PCT/US00/12386, filed on May 5, 2000.

(60) Provisional application No. 60/132,673, filed on May 5, 1999.

(51) Int. Cl.
*G06F 17/30* (2006.01)

(52) U.S. Cl. .......................... 707/2; 707/102
(58) Field of Classification Search ................ 707/2–3, 707/5, 102; 715/514, 517, 700
See application file for complete search history.

(56) References Cited

U.S. PATENT DOCUMENTS

| | | | |
|---|---|---|---|
| 5,157,783 A | 10/1992 | Anderson et al. | 395/600 |
| 5,265,065 A | 11/1993 | Turtle | 395/600 |
| 5,321,833 A * | 6/1994 | Chang et al. | 707/5 |
| 5,418,948 A | 5/1995 | Turtle | 395/600 |
| 5,434,932 A | 7/1995 | Scott | 382/309 |
| 5,488,725 A | 1/1996 | Turtle et al. | 395/600 |
| 5,497,317 A | 3/1996 | Hawkins et al. | 364/408 |
| 5,644,720 A | 7/1997 | Boll et al. | 395/200.12 |
| 5,708,825 A | 1/1998 | Sotomayor | 715/501.1 |
| 5,794,236 A | 8/1998 | Mehrle | 707/5 |
| 5,815,392 A | 9/1998 | Bennett et al. | 705/8 |
| 5,940,821 A * | 8/1999 | Wical | 707/3 |
| 6,038,560 A * | 3/2000 | Wical | 707/5 |
| 6,088,692 A * | 7/2000 | Driscoll | 707/5 |
| 6,289,342 B1* | 9/2001 | Lawrence et al. | 707/7 |
| 2002/0103836 A1* | 8/2002 | Fein et al. | 707/531 |

OTHER PUBLICATIONS

Aha, David W., "Instance-based Learning Algorithms", *Machine Learning*, 6, (1991),37-66.

(Continued)

*Primary Examiner*—Mohammad Ali
*Assistant Examiner*—Susan Rayyan
(74) *Attorney, Agent, or Firm*—Schwegman, Lundberg, Woessner & Kluth, P.A.

(57) ABSTRACT

Every year, professional classifiers at West Group manually classify over 350,000 headnotes, or abstracts of judicial opinions, across approximately 82,000 separate classes of the Key Number System. Although most headnotes are classified from the memory of the classifiers, a significant number are difficult and thus costly to classify manually. Accordingly, the inventors devised systems, methods, and software that facilitate manual classification of headnotes and documents generally and hard-to-classify headnotes particularly. One exemplary system provides a graphical user interface that concurrently displays an unclassified headnote, a ranked list of one or more candidate classes, a candidate class in combination with adjacent classes of the classification system, and at least one classified headnote that is associated with one of the candidate classes.

11 Claims, 7 Drawing Sheets

OTHER PUBLICATIONS

Callan, James P., "The Inquery Retrieval System", *In Proceedings of the Third International Conference on Database and Expert Systems Applications*, Valencia, Spain; Springer-Verlag,(1992),78-83.

Cohen, W. and H. Hirsh, "Joints that generalize: Text classification using Whirl", *In Proceedings of the Fourth International Conference on Knowledge Discovery and Data Mining (KDD-98)*, New York, NY, AAAI Press,(1998),169-173.

Cohen, W. and Y. Singer, "Context-sensitive Learning Methods for Text Caterogization", *In Proceedings of the Nineteenth Annual International ACM SIGIR conference on Research and Development in Information Retrieval*, Zurich, Switzerland,(1996).

Creecy, Robert H., "Trading MIPS and memory for knowledge engineering: Classifying census returns on the connection machine", *Communication of the ACM, 35*, (Jul. 1992),48-63.

Dasarathy, B V., "Nearest Neighbor (NN) Norms: NN Pattern Classification Techniques", *IEEE Computer Society Press*, (1990).

Hayes, P. and S. Weinstein, "CONSTRUE/TIS: a system for content-based indexing of a database of news stories", *In Second Annual Conference on Innovative Applications of Artificial Intelligence*, (1990).

Larkey, L.S. and W. B. Croft, "Combining Classifiers in Text Categorization", *Proceedings, 19th Annual International ACM SIGIR Conference on Research and Development in Information Retrieval*, Zurich, Switzerland,(1996),289-297.

Lewis, David D., "Feature Selection and Feature Extraction for Text Categorization", *In Proceedings of Speech and Natural Language Wrokshop*, Arden House,(1992),212-217.

Masand, Brij, "Classifying News Stories using Memeory Based Reasoning", *Proceedings of the Fifteenth Annual International ACM SIGIR Conference on Research and Development in Information Retrieval*, Copenhagen, Denmark,(1992),59-65.

Porter, M. F., "An Algorithm for Suffix Stripping", *Program, 14(3)*(Jul. 1980),130-137.

Salton, Gerard, *Automatic Text Processing*, Addision-Wesley Publishing Company, Reading, MA,(1989),229-470.

Standfill, C. and D. Waltz, "Toward Memory-Based Reasoning", *Communications of the ACM, 29(12)*, (1986),1213-1228.

Turtle, Howard R., "Inference Networks for Document Retrieval", *PhD Thesis, Computer and Information Science Department*, University of Massachusetts,(Oct. 1991).

Yang, Yiming, "Expert Network: Effective and efficient learning form human decisions in tex categorization and retrieval", *In Proceedings of the Seventeenth Annual International ACM SIGIR Conference on Research and Development in Information Retrieval*, (1994),13-22.

\* cited by examiner

300

┌─────────────────────────────────────────┐
│ EMPLOYER'S DUTY, UNDER NLRA, TO BARGAIN IN │
│ GOOD FAITH INCLUDES OBLIGATION TO PROVIDE │
│ UNION WITH INFORMATION RELEVANT TO COLLECTIVE │
│ BARGAINING PROCESS IN CERTAIN CIRCUMSTANCES. │
└─────────────────────────────────────────┘

300'

```
sum (
    employer
    duty
    nlra
    bargain
    #phase (
        good
        faith
    )
    includes
    obligation
    provide
    union
    information
    relevant
    #phase (
        collective
        bargaining
    )
    process
    certain
    circumstances
    #phase (
        national
        labor
        relations
        act
    )
    amended
)
```

FIG. 3

DOCUMENT-CLASSIFICATION SYSTEM, METHOD AND SOFTWARE

CROSS-REFERENCE TO RELATED APPLICATIONS

This application is a continuation of International Application No. PCT/US00/12386, filed May 5, 2000, which claims priority on U.S. provisional patent application 60/132673 which was filed May 5, 1999. Both applications are incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyright whatsoever. The following notice applies to this document: Copyright© 1999, West Group

TECHNICAL FIELD

The present invention concerns document classification systems and methods for legal documents, such as judicial decisions.

BACKGROUND

The American legal system, as well as some other legal systems around the world, relies heavily on written judicial opinions—the written pronouncements of judges—to articulate or interpret the laws governing resolution of disputes. Each judicial opinion is not only important to resolving a particular dispute, but also to resolving all similar disputes in the future. This importance reflects the principle of American law that the judges within a given jurisdiction should decide disputes with similar factual circumstances in similar ways. Because of this principle, judges and lawyers within the American legal system are continually searching an ever-expanding body of past decisions, or case law, for the decisions that are most relevant to resolution of particular disputes.

To facilitate this effort, companies, such as West Group (formerly West Publishing Company) of St. Paul, Minn., not only collect and publish the judicial opinions of jurisdictions from almost every federal and state jurisdiction in the United States, but also classify the opinions based on the principles or points of law they contain. West Group, for example, classifies judicial opinions using its proprietary Key Number™ System. (Key Number is a trademark of West Group.) This system has been a seminal tool for finding relevant judicial opinions since the turn of the century.

The Key Number System is a hierarchical system of over 400 major legal topics, with the topics divided into subtopics, the subtopics into sub-subtopics, and so on. Each topic or sub-topic has a unique alpha-numeric code, known as its Key Number classification. Table 1 shows an example of a portion of the Key Number System for classifying points of divorce law:

TABLE 1

Key Number hierarchy and corresponding Topic Descriptions

| Key Number Classification | Topic Description |
|---|---|
| 134 | Divorce |
| 134V | Alimony, Allowances, and Property Disposition |
| 134k230 | Permanent Alimony |
| 134k235k | Discretion of Court |

At present, there are approximately 82,000 Key Number classes or categories, each one delineating a particular legal concept.

Maintaining the Key Number System is an enormous on-going effort, requiring hundreds of professional editors to keep up with the thousands of judicial decisions issued throughout the United States ever year. Professional attorney-editors read each opinion and annotate it with individual abstracts, or headnotes, for each point of law it includes. The resulting annotated opinions are then passed in electronic form to classification editors, or classifiers, who read each headnote and manually assign it to one or more classes in the Key Number System. For example, a classifier facing the headnote: "Abuse of discretion in award of maintenance occurs only where no reasonable person would take view adopted by trial court assigned." would most likely assign it to Key Number class 134k235, which as indicated in Table 1, corresponds to the Divorce subtopic "discretion of court".

Every year, West Group classifiers manually classify over 350,000 headnotes across the approximately 82,000 separate classes of the Key Number classification system. Over time, many of the classifiers memorize significant portions of the Key Number System, enabling them to quickly assign Key Number classes to most headnotes they encounter. However, many headnotes are difficult to classify. For these, the classifier often invokes the WestLaw™ online legal search service, which allows the user to manually define queries against a database of classified headnotes. (WestLaw is a trademark of West Group.)

For instance, if presented with the exemplary "abuse of discretion" headnote, an editor might define and run a query including the terms "abuse," "discretion," "maintenance," and "divorce." The search service would return a set of annotated judicial opinions compliant with the query and the classifier would in turn sift through the headnotes in each judicial opinion, looking for those most similar to the headnote targeted for classification. If one or more of the headnotes satisfies the editor's threshold for similarity, the classifier manually assigns the Key Number classes associated with these headnotes to the target headnote. The classifier, through invocation of a separate application, may also view an electronic document listing a portion of the Key Number System to help identify related classes that may not be included in the search results.

The present inventors recognized that this process of classification suffers from at least two problems. First, even with use of online searching, the process is quite cumbersome and inefficient. For example, editors are forced to switch from viewing a headnote in one application, to a separate online search application to manually enter queries and view search results, to yet another application to consult a classification system list before finally finishing classification of some hard-to-classify headnotes. Secondly, this conventional process of classification lacks an efficient method of correcting misclassified headnotes. To correct misclassified headnotes, a classifier makes a written request to a database administrator with rights to a master headnote database.

Accordingly, there is a need for systems, methods, and software that not only streamline manual classification processes, but also promote consistency and accuracy of resulting classifications.

SUMMARY

To address this and other needs, the inventors devised systems, methods, and software that facilitate the manual classification of documents, particularly judicial opinions according to a legal classification system, such as West Group's Key Number System. One exemplary system includes a personal computer or work station coupled to a memory storing classified judicial headnotes or abstracts and a memory containing one or more headnotes requiring classification. The personal computer includes a graphical user interface that concurrently displays one of the headnotes requiring classification, a list of one or more candidate classes for the one headnote, at least one classification description associated with one of the listed candidate classes, and at least one classified headnote that is associated with one of the listed candidate classes. The graphical user interface also facilitates user assignment of the one headnote requiring classification to one or more of the listed candidate classes.

In the exemplary system, the list of candidate classes results from automatically defining and executing a query against the classified headnotes, with the query derived from the one headnote requiring classification. The exemplary system also displays the candidate classes in a ranked order based on measured similarity of corresponding classified headnotes to the headnote requiring classification, further assisting the user in assigning the headnote to an appropriate class. Other features of the interface allow the user to reclassify a classified headnote and to define and execute an arbitrary query against the classified headnotes to further assist classification.

BRIEF DESCRIPTION OF DRAWINGS

FIG. 3 is a diagram illustrating an unclassified document or headnote 300 and a structured query 300' derived from headnote 300 during operation of classification system 100;

DETAILED DESCRIPTION OF PREFERRED EMBODIMENTS

This description, which references and incorporates the Figures, describes one or more specific embodiments of one or more inventions. These embodiments, offered not to limit but only to exemplify and teach the one or more inventions, are shown and described in sufficient detail to enable those skilled in the art to implement or practice the invention. Thus, where appropriate to avoid obscuring the invention, the description may omit certain information known to those of skill in the art.

The description includes many terms with meanings derived from their usage in the art or from their use within the context of the description. However, as a further aid, the following term definitions are presented.

The term "document" refers to any logical collection or arrangement of machine-readable data having a filename.

The term "database" includes any logical collection or arrangement of machine-readable documents.

Figure 1:
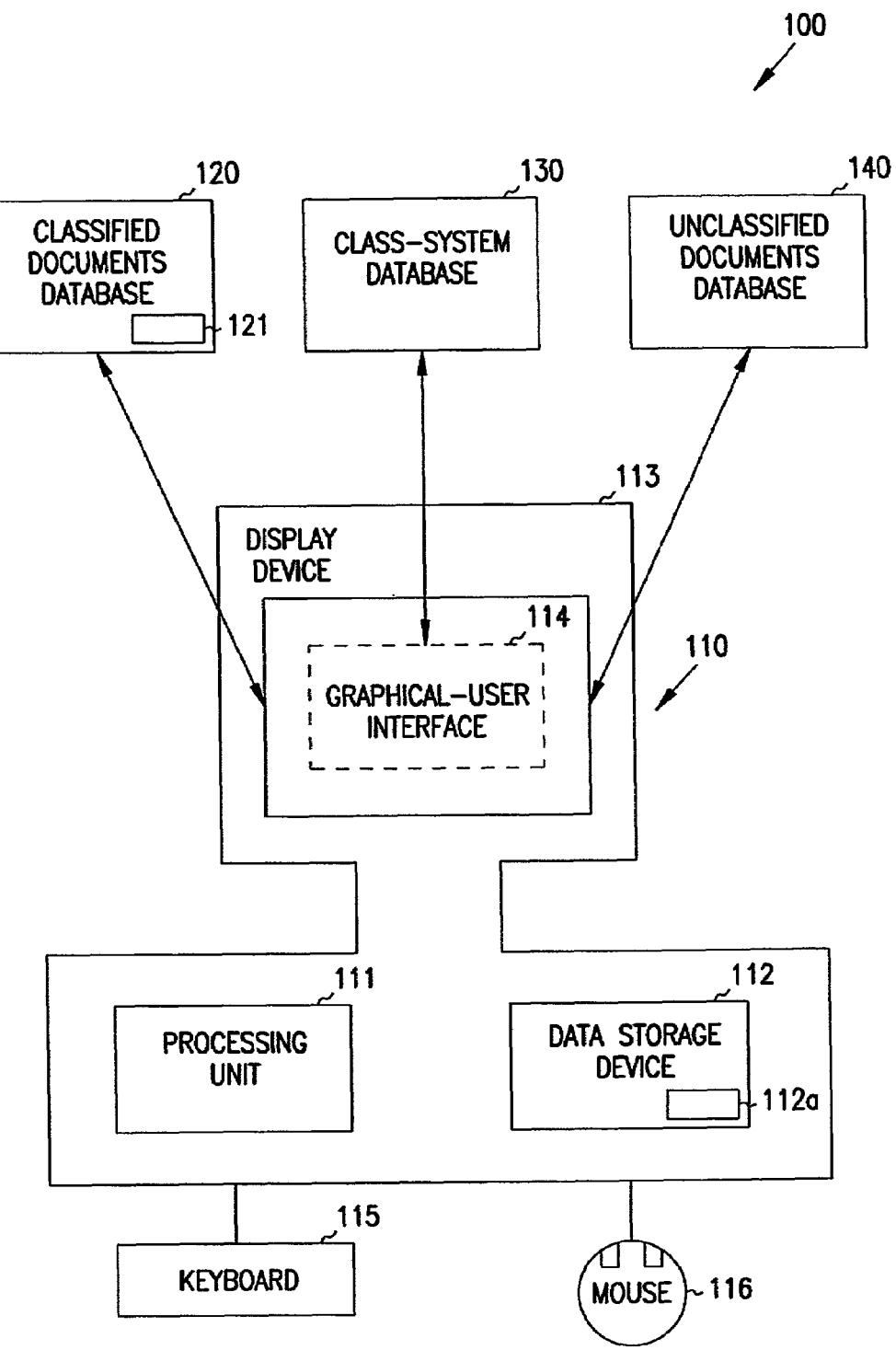
FIG. 1 is a diagram of an exemplary classification system 100 embodying several aspects of the invention, including a unique graphical user interface 114.

FIG. 1 shows a diagram of an exemplary document classification system 100 for assisting editors in manually classifying electronic documents according to a document classification scheme. The exemplary embodiment assists in the classification of judicial abstracts, or headnotes, according to West Group's Key Number System. For further details on the Key Number System, see West's Analysis of American Law: Guide to the American Digest System, 2000 Edition, West Group, 1999. This text is incorporated herein by reference. However, the present invention is not limited to any particular type of documents or type of classification system.

System 100 includes an exemplary personal computer or classification work station 110, an exemplary classified documents database 120, an exemplary classification system database 130, and an unclassified documents database 140. Though the exemplary embodiment presents work station 110, and databases 120–140 as separate components, some embodiments combine the functionality of these components into a greater or lesser number of components. For example, one embodiment combines databases 120–140 within work station 110, and another embodiment combines database 130 with work station 110 and databases 120 and 140 into a single database.

The most pertinent features of work station 110 include a processing unit 111, a data-storage device 112, a display device 113, a graphical-user interface 114, and user-interface devices 115 and 116. In the exemplary embodiment, processor unit 111 includes one or more processors and an operating system which supports graphical-user interfaces. Storage device 112 include one or more electronic, magnetic, and/or optical memory devices. However, other embodiments of the invention, use other types and numbers of processors and data-storage devices. For examples, some embodiment implement one or more portions of system 100 using one or more mainframe computers or servers, such as the Sun Ultra 4000 server. Exemplary display devices include a color monitor and virtual-reality goggles, and exemplary user-interface devices include a keyboard, mouse, joystick, microphone, video camera, body-field sensors, and virtual-reality apparel, such as gloves, headbands, bodysuits, etc. Thus, the invention is not limited to any genus or species of computerized platforms.

Classified documents database 120 includes documents classified according to a classification system. In the exemplary embodiment, database 120 includes an indexed collection of approximately twenty million headnotes spanning the entirety of the West Group's Key Number System. However, some embodiments include an indexed subset of the total collection of classified headnotes. For example, one embodiment indexes headnotes from decisions made within the last 25 years. This reduces the number of headnotes by about half and thus reduces the time necessary to run queries against the the headnotes. Other embodiments further reduce the size of the training collection to include only headnotes specific to the jurisdiction of the query. This is expected not only to result in retrieval of headnotes with greater similarity, but also to further reduce processing time. Each headnote in the training collection has one or more logically associated Key Number classification codes.

An exemplary indexing procedure entails tokenizing the headnotes, generating transactions, and creating an inverted file. Tokenization entails reading in documents and removing predetermined stop-words, single digits, and stems. The exemplary embodiment uses the Porter stemming algorithm to remove stems. See, M. F. Porter, An Algorithm for Suffix Stripping, Program, 14(3):130–137, July 1980. Single digits are removed since they tend to appear as item markers in enumerations and thus contribute very little to the substance of headnotes.

After tokenization, the procedure generates a transactions for each headnote. A transaction is a tuple grouping a term t, a document identifier n, the frequency of the term t in the document n, and the positions of the term t in document n. Next, the procedure creates an inverted file containing records. The records store the term, the number of documents in the collection that contain the term, and the generated transactions. The inverted file allows efficient access to term information at search time. For further details, see G. Salton, Automatic Text Processing: the Transformation, Analysis and Retrieval of Information by Computer, Addison Wesley, 1989.

In addition to an indexed collection of headnotes, database 120 also includes a search engine 121. In the exemplary embodiment, search engine 121 comprises a natural-language search engine, such as the natural language version of WestLaw® legal search tools. However, other embodiments include other search engines based on the work by H. Turtle, Inference Networks for Document Retrieval, PhD thesis, Computer and Information Science Department, University of Massachusetts, October 1990. Still other embodiments use an Inquery Retrieval System as described in J. P. Gallan, W. B. Croft, and S. M. Harding, The Inquery Retrieval System. In Proceedings of the Third International Conference on Database and Expert Systems Applications, pages 78–83, Valencia, Spain, 1992. Springer-Verlag. 82,000 classes of West Group's Key Number System. Each class description includes its Key Number code, a topic description, and data linking the class to adjacent classes.

Unclassified documents database 140 includes a set of one or more unclassified documents. In the exemplary embodiment, each document is an unclassified headnote or more generally a headnote requiring initial classification or reclassification. Moreover, each headnote has a corresponding judicial opinion. In the exemplary embodiment, the headnotes are determined manually by professional editor. However, other embodiments may determine headnotes automatically using a computerized document or text summarizer. See for example U.S. Pat. No. 5,708,825 to Bernardo Rafael Sotomayer, which is incorporated herein by reference.

System 100 also includes, within data-storage device 112, classification-aiding software 112a. In the exemplary embodiment, software 112a comprises one or more software modules and operates as a separate application program or as part of the kernel or shell of an operating system. (Software 112a can be installed on work station 110 through a network-download or through a computer-readable medium, such as an optical or magnetic disc, or through other software transfer methods.) In the exemplary embodiment, software 112a enables system 100 to generate graphical-user interface 114 which integrates unclassified headnotes from database 140 with classified headnotes and ranked candidate classes from database 120 and classification system data from database 130 to assist users in manually classifying or reclassifying headnotes.

Figure 2:
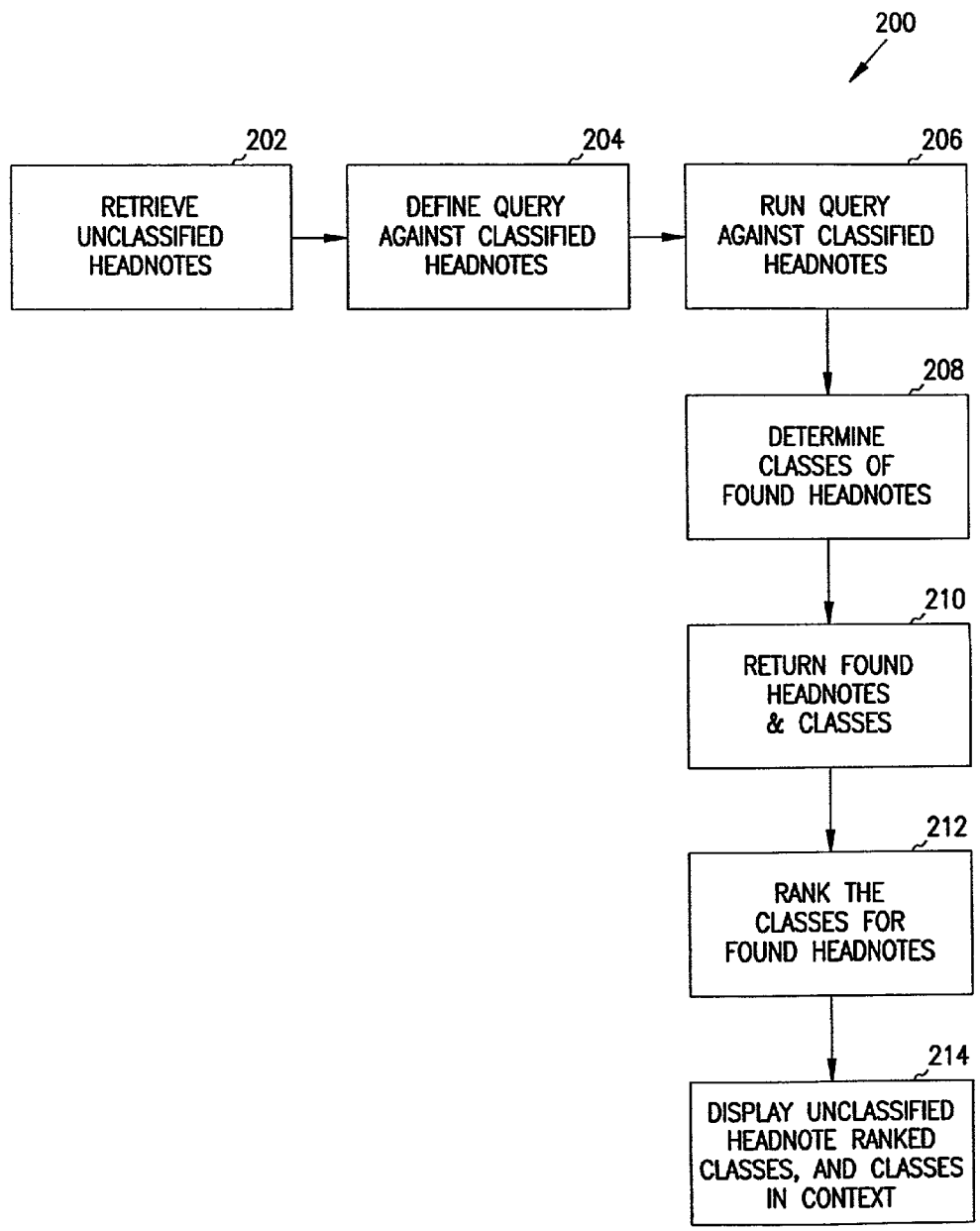
FIG. 2 is a flowchart illustrating an exemplary method embodied in classification system 100 of FIG. 1.

FIG. 2 shows a flow chart 200 of an exemplary classification method at least partly embodied within and facilitated by software 112a. Flow chart 200 includes a number of process blocks 202–214, which are arranged serially in the exemplary embodiment. However, other embodiments of the invention may reorder the blocks, omits one or more blocks, and/or execute two or more blocks in parallel using multiple processors or a single processor organized as two or more virtual machines or subprocessors. Moreover, still other embodiments implement the blocks as one or more specific interconnected hardware or integrated-circuit modules with related control and data signals communicated between and through the modules. Thus, the exemplary process flow is applicable to software, firmware, and hardware implementations.

The exemplary method begins at process block 202 with automatic or user-directed retrieval of a set of one or more unclassified headnotes from unclassified document database 140. For system embodiments that include two or more classification work stations, a number of sets of unclassified headnotes can be scheduled for classification at particular stations or a set of unclassified headnotes can be queued for sequential distribution to the next available work station. Some embodiments allow the user to define and run a query against the unclassified headnotes and in effect define the set of headnotes he or she will classify or alternatively transfer the set of headnotes to another work station for classification. After retrieval of the unclassified headnotes, execution of the exemplary method then proceeds to block 204.

Block 204 entails defining a query based on one of the headnotes in the set of unclassified headnotes. In the exemplary embodiment, this entails forwarding the one headnote to the natural-language search engine 121 which automatically defines the query using the indexing procedure already applied to index the classified headnotes of database 120. FIG. 3 shows the text of a sample headnote 300 and a structured query 300' that search engine 121 derives from it. Although the exemplary embodiment relied on the inherent functionality of its search engine 121 for this query definition some embodiments include a query structuring or definition module within software 112a.

After defining the query, the exemplary method runs, or executes, the query against the classified document database 120, as indicated in block 206. In the exemplary embodiment, search engine 121, which has already defined the query from the unclassified headnote, executes a search based on the query. In executing the search, search engine 121 implements memory-based reasoning, a variant of a k-nearest neighbor method. This generally entails retrieving the classified headnotes that are closest to the unclassified headnote, or more precisely the query form of the unclassified headnote, based on some distance function. More particularly, the exemplary embodiment compares the query to each classified headnote in the database, scores all the terms, or concepts, that each classified headnote has in common with the query, sums the scores of all the common terms, and divides by the total number of query terms in the classified headnote to determine an average score for the classified headnote.

In the exemplary embodiment, search engine 121 scores individual terms using the following formula:

$$w(t,d) = 0.4 + 0.6 \times tf(t,d) \times idf(t),$$

where w(t,d) denotes the weight, or score, for term t in document (or headnote) d; idf(t) denotes an inverse-document-frequency factor for the term t and tf(t,d) denotes the term-frequency factor for term t in document d. The inverse-document-frequency factor idf(t) is defined as $$idf(t) = (\log(N) - \log[df(t)])/\log(N),$$

and the term-frequency factor tf(t,d) for term t in document d is defined as $$tf(t,d) = 0.5 + 0.5 \times \log[f(t,d)]/\log(\text{max}tf),$$

where N is the total number of documents (headnotes) in the collection, df(t) is the number of documents where term t appears, f(t,d) is the number of occurrences of term t in document d, and maxtf is the maximum frequency of any term in document d. The inverse-document-frequency factor (idf) favors (that is, gives greater weight to) terms that are rare in the collection, while the term frequency factor (tf) gives a higher importance to terms that are frequent in the document being scored.

The result of the search is a ranked list of document-score pairs, with each score indicating the similarity between a retrieved classified document and the query. The score is the metric for finding the nearest neighbors. Execution of the method then continues to block 208.

Block 208 entails determining the classes associated with a predetermined number k of the top classified headnotes from the ranked list of search results. The k classified headnotes are the k nearest neighbors of the unclassified headnote according to the distance function used in search engine 121. Exemplary values for k include 5, 10, 25, 50, and 100. In the exemplary embodiment, some of the classified headnotes have two or more associated Key Number classes.

After determining all the classes associated with the k classified headnotes most similar to the unclassified headnote, the method executes block 210 which entails transferring the k classified headnotes and their associated class identifiers from classified document database 120 to work station 110.

As block 212 shows, the station 110, or more particular processor unit 111, next determines a ranking for the class identifiers (Key Number classes) associated with the top k classified headnotes. The exemplary embodiment ranks the class identifiers based on their frequencies of occurrence within the set of candidate classes. In other words, each class identifier is ranked based on how many times it appears in the set of candidate classes.

Other embodiments rank the classes based on respective total similarity scores. For a given candidate class, the total similarity score is the sum of the similarity scores for all the headnotes associated with the class. Some embodiments rank the similarity scores for all the headnotes associated with a class, weight the ranks according to a function, and then sum the weighted ranks to determine where to rank the class. Two exemplary rank-weighting functions are:

$$w(r) = 1/r \text{ and}$$

$$w(r) = (1 - \epsilon \times r),$$

where w denotes the weight function and r denotes rank. $\epsilon = 1/(k+1)$, k being the number of nearest neighbors. Functions such as these give a higher weight to a Key Number class assigned to a document at the top of the retrieved set, and a lower weight when the document is at a lower position.

Figure 4A:
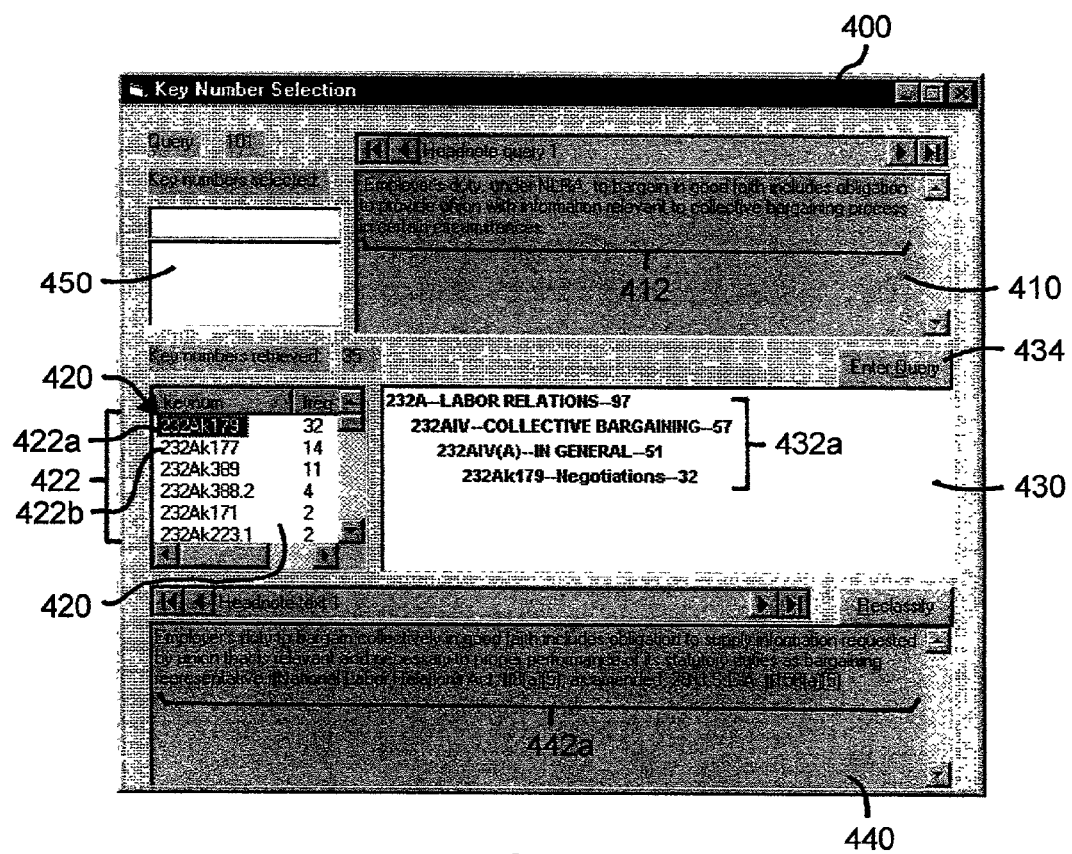
FIG. 4A is a facsimile of an exemplary graphical user interface 400 that forms a portion of classification system 100.

After ranking the candidate classes, the system executes block 214 which entails displaying on display device 113 (shown in FIG. 1) the exemplary graphical user interface 400 which is shown in FIG. 4A. Graphical user interface 400 includes concurrently displayed windows or regions 410, 420, 430, 440, and 450.

Window 410 displays the one unclassified headnote, headnote 300 of FIG. 3, which was selected or retrieved from classification in block 202 of the exemplary flow chart in FIG. 2. Window 420 displays a sorted list or table 422 of candidate classes and their corresponding frequencies. A class 422a in list 422 is highlighted in subregion 420a of window 420. Window 430 displays a portion 432a of the classification system hierarchy which includes class 422a. Window 440 displays one or more of the classified headnotes that is similar to the one unclassified headnote and which has class 422a as one of its assigned classes. Window 450 is an input window for assigning one or more classes to unclassified headnote 412 displayed in window 410.

In operation, interface devices 114–116 of system 100 enable a user to highlight or select one or more of the candidate classes in list 422. For example, a user may point and double click on candidate class 422a (232Ak179) to select the class, or a user may single click on the class to highlight it for further consideration. Selecting, or double-clicking, a class in the list, results in automatic insertion of the class into window 450. The interface not only allows the user to select as many of the classes as desired, but also to manually insert one or more classes, including classes not listed, into window 450. When interface 400 is closed, it prompts the user to save, or in effect, actually assign the one or more classes in window 450 to the headnote in window 410. In response to highlighting class 422a, interface 400 displays subregion 420a of window 420 in reverse-video, that is, by reversing the background and foreground colors of subregion 420a. (Other embodiments use other techniques not only to indicate selection of one of the classes, but also to select one or more of the classes.)

In further response to highlighting a class in list 422 of window 420, classification station 110 (in FIG. 1) defines a query based on all or a portion of the highlighted class and runs it against classification system database 130. Database 130 returns one or more classes in the neighborhood of the selected class to station 110, and window 430 displays one or more of these neighborhood classes, as portion 432a, allowing the user to view the highlighted class in context of the classification system, complete with class identifiers and class descriptors.

In addition to responding to highlighting of class 422a by displaying it in context of the classification system in window 430, the interface also displays in window 440 one or more of the classified headnotes that is similar to the headnote being classified. In other words, window 440 displays one of the headnotes, such as headnote 442a, which resulted in the highlighted class 422a being included in list 422. If there are more than one of these headnotes, window 440 allows the user to view each of them in order from most similar to least similar to the headnote being classified.

Figure 4B:
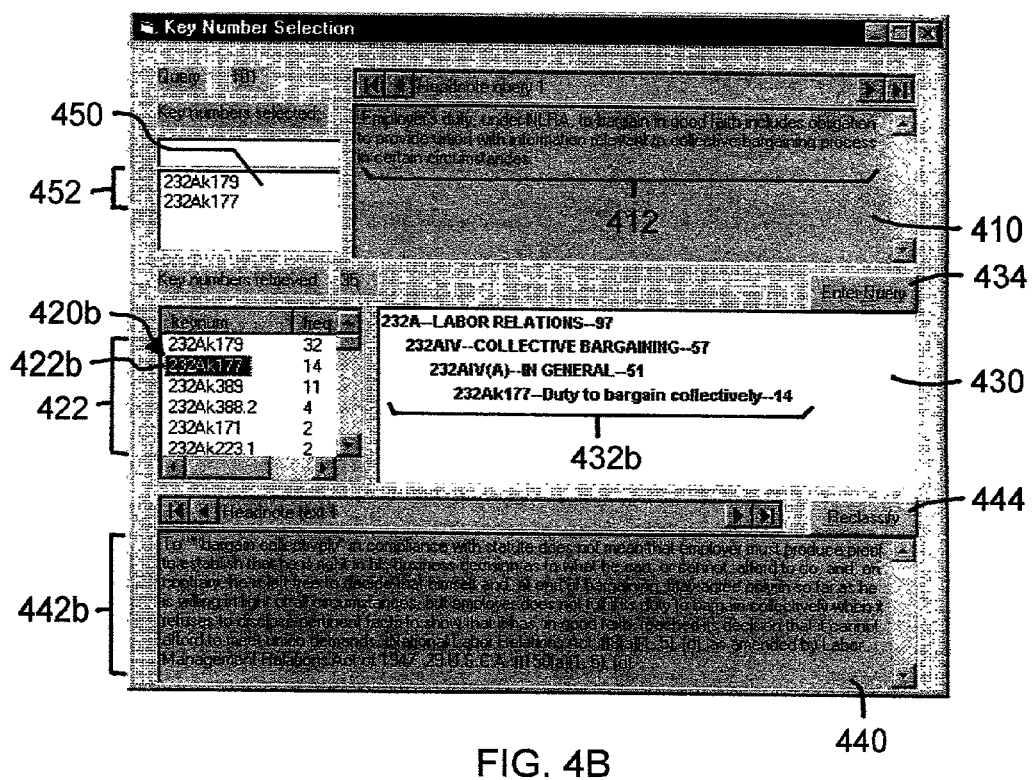
FIG. 4B is a facsimile of exemplary graphical user interface 400 after responding to a user input.

FIG. 4B shows that the user may also highlight another class, such as class 422b in the list 422 to view this class in context of the classification system in window 430 and to view the classified headnotes associated with the class in window 440. More specifically, window 430 shows a portion 432b of the classification system stored in database 130, and window 440 shows a headnote 442b associated with highlighted class 422b. The interface allows the user to repeat this process with each of the classes in list.

Figure 4C:
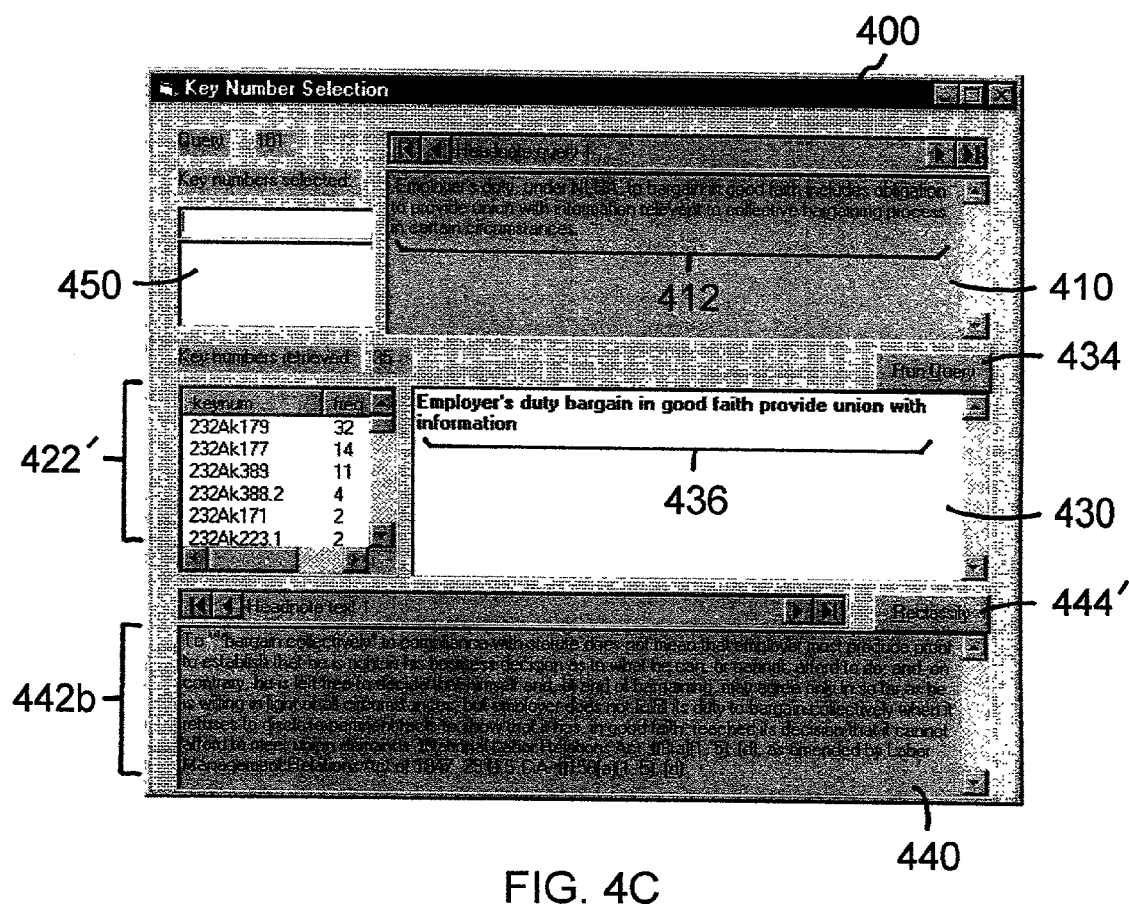
FIG. 4C is a facsimile of exemplary graphical user interface 400 after responding to another user input.

Window 430 also includes an enter-query button 434 which the user may invoke to convert window 430 into a query-entry window 430' as shown in FIG. 4C. This figure shows an exemplary query 436, which the user has defined to include several terms and/or phrases from or related to unclassified headnote 412 in window 410. The figure also shows that enter-query button 434 has been converted to a run-query button 434', which the use may actuate after entering query 436. Actuating the run-query button runs the query against classified documents database 120, and results in representation of interface 400, with an updated list 422' of candidate classes for possible assignment to the unclassified headnote. (Once the user highlights one of the classes in the updated list 422', window 430 will display this class in context of the classification system hierarchy. This user-invokable option of defining and running queries further facilitates classification of headnotes when the candidate classes stemming form the automatically defined queries are unsatisfactory.

Figure 5:
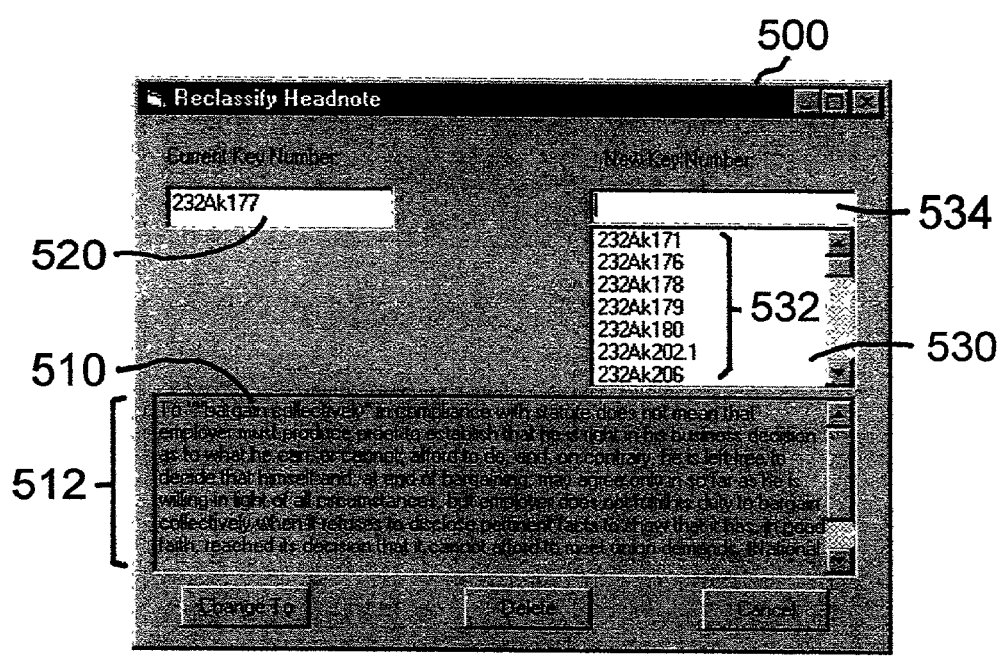
FIG. 5 is a facsimile of an exemplary graphical user interface 500.

When viewing the classified headnotes in window 440, the user may recognize that a particular headnote has been misclassified and thus require reclassification. Thus, window 440 includes a reclassification button 444, which the user can invoke to initiate reclassification of the particular headnote, such as headnote 442b to another class. Invocation of button 444 results in display of window 500 as shown in FIG. 5.

Window 500 includes a region 510 that displays a headnote 512 that is being reclassified, a region 520 which displays the highlighted class from list 422 that is associated with the headnote, and region 530 displays a ranked list 532 of candidate classes and an input field 534 for entry of new class. Ranked list 532 is developed using the same process used for developing list 422.

CONCLUSION

In furtherance of the art, the inventors have presented exemplary systems, methods, and software that facilitate the manual classification of documents, particularly judicial headnotes according to a legal classification system, such as West Group's Key Number System. One exemplary system includes a single graphical user interface that concurrently displays one of the headnotes requiring classification, a list of one or more candidate classes for the one headnote, at least one classification description associated with one of the listed candidate classes, and at least one classified headnote that is associated with one of the listed candidate classes. The exemplary interface integrates two or more tools necessary for a user to accurately and efficiently classify judicial headnotes or other documents.

The embodiments described above are intended only to illustrate and teach one or more ways of practicing or implementing the present invention, not to restrict its breadth or scope. The actual scope of the invention, which embraces all ways of practicing or implementing the concepts of the invention, is defined only by the following claims and their equivalents.

The invention claimed is:

1. A method of classifying one or more documents in a classification scheme including two or more classes, with each class having one or more classified document summaries, the method comprising:
   summarizing a particular document to define a particular document summary;
   automatically generating a list of one or more of the classes, with each listed class having one or more classified document summaries which are similar to the particular document summary, wherein generating a list of one or more of the classes comprises:
   defining one or more natural-language or boolean queries based on the particular document summary;
   performing one or more searches of the classified document summaries based on one or more of the queries, with one or more of the searches yielding one or more found document summaries;
   ranking the one or more found document summaries based on relative similarity to the particular document summary to define one or more ranked document summaries; and
   generating the list based on one or more of the ranked document summaries; and
   classifying the particular document based on the list of classes.

2. A method of classifying one or more documents in a classification scheme including two or more classes, with each class having one or more classified document summaries, the method comprising:
   summarizing a particular document to define a particular document summary;
   automatically generating a list of one or more of the classes, with each listed class having one or more classified document summaries which are similar to the particular document summary, wherein generating a list of one or more of the classes comprises:
   defining one or more natural-language or boolean queries based on the particular document summary;
   performing one or more searches of the classified document summaries based on one or more of the queries, with one or more of the searches yielding one or more found document summaries;
   ranking the one or more found document summaries based on relative similarity to the particular document summary to define one or more ranked document summaries; and
   generating the list based on one or more of the ranked document summaries; and
   classifying the particular document based on the list of classes, wherein classifying the particular document based on the list of classes comprises manually selecting one or more of the classes using a graphical user interface or automatically selecting one or more of the classes using a predetermined selection procedure.

3. The method of claim 2, wherein:
   summarizing comprises a step for summarizing a particular document to define a particular document summary;
   automatically generating comprises a step for automatically generating a ranked list of one or more of the classes, with each listed class having one or more classified document summaries which are similar to the particular document summary; and
   classifying comprises a step for classifying the particular document based on the list of classes.

4. The method of claim 2, wherein summarizing a particular document comprises manually summarizing the particular document or electronically summarizing the particular document using a computerized document summarizer.

5. A method of classifying one or more documents, comprising
provided a classification scheme including two or more classes, with each class having one or more classified document summaries logically associated with it;
summarizing a particular document to define a particular document summary;
automatically generating a list of one or more of the classes, with each listed class having one or more classified document summaries which are similar to the particular document summary, wherein generating a list of one or more of the classes comprises:
defining one or more natural-language or boolean queries based on the particular document summary;
performing one or more searches of the classified document summaries based on one or more of the queries, with one or more of the searches yielding one or more found document summaries;
ranking the one or more found document summaries based on relative similarity to the particular document summary to define one or more ranked document summaries; and
generating the list based on one or more of the ranked document summaries; and
classifying the particular document based on the list of classes.

6. A method of classifying one or more documents, comprising
providing a classification scheme including two or more classes, with each class having one or more classified document summaries logically associated with it;
summarizing a particular document to define a particular document summary;
automatically generating a list of one or more of the classes, with each listed class having one or more classified document summaries which are similar to the particular document summary;
classifying the particular document based on the list of classes; and
adding one or more classes to the classification scheme, with each added class having one or more classified document summaries logically associated with it.

7. The method of claim 6, wherein each class has an associated legal concept and the particular document is a judicial opinion or secondary legal source.

8. The method of claim 6, wherein the classification scheme conforms at least in part with a version of the West Key Numbering System.

9. A computer-readable magnetic, electronic, or optical medium comprising computer-executable instructions for:
causing a computer to read at least part of a classification scheme into memory, the classification scheme including two or more classes with each class having one or more classified document summaries logically associated with it;
causing the computer to summarize in memory a particular document to define a particular document summary;
causing the computer to generate a list in memory of one or more of the classes, with each listed class having associated with it one or more classified document summaries which are similar to the particular document summary, wherein the instructions for generating a list of one or more of the classes comprises instructions for:
causing the computer to define one or more natural-language or boolean queries based on the particular document summary;
causing the computer to perform one or more searches of the classified document summaries based on one or more of the queries, with one or more of the searches yielding one or more found document summaries;
causing the computer to rank the one or more found document summaries based on relative similarity to the particular document summary to define one or more ranked document summaries; and
causing the computer to generate the list based on one or more of the ranked document summaries; and
causing the computer to classify the particular document based on the list of classes.

10. The medium of claim 9, further comprising computer-executable instructions for:
causing the computer to request manual input for adding or to automatically add one or more classes to the classification scheme, with each added class having one or more classified document summaries logically associated with it.

11. The medium of claim 9, wherein the classification scheme conforms at least in part with a version of the West Key Numbering System.

* * * * *